3,378,410

CORROSION-RESISTANT COATING FOR MAGNESIUM DIE CASTINGS

Helen B. Bartlett, Flint, Mich., assignor to General Motors Corporation, Detroit, Mich., a corporation of Delaware No Drawing. Filed Apr. 26, 1965, Ser. No. 451,009
13 Claims. (Cl. 148—6.27)

This invention relates to magnesium die castings and more particularly to magnesium die castings having a surface coating of a complex silicate composition for corrosion resistance.

Magnesium die castings are porous and therefore present a surface vulnerable to corrosion by salt solution. Automobile parts, such as fuel pumps, are often exposed to a corrosive salt spray environment. It is, of course, imperative that such important functional parts do not fail because of corrosion. For this reason, it is desirable to have an economical and highly effective method of protecting magnesium die castings from salt solution attack.

It is an object of this invention to provide a magnesium die casting resistant to attack by salt solution.

It is another object of this invention to provide method of coating a magnesium die casting with a complex silicate composition resistant to attack by salt solution.

It is a more specific object of this invention to provide a magnesium or magnesium alloy die casting having a surface of complex silicate composition resistant to attack by salt solution.

These and other objects are accomplished by preparing a silicate coating composition, cleaning the surface of the magnesium die casting, applying said silicate coating to the magnesium die casting, and by heating of the coated magnesium die casting until the coating has been dehydrated and has reacted with the underlying metal surface. A full description of the method by which the subject corrosion resistant magnesium die casting is obtained follows wherein preferred embodiments of the present invention are clearly shown.

The novel silicate coating composition comprises two components: (1) an aqueous solution of an alkali metal silicate, and (2) an aqueous suspension of a complex magnesium-aluminum silicate chosen from the group comprised of hectorite and montmorillonite. These two components are prepared separately in advance and mixed in proper proportions.

In preparation of the aqueous solution sodium silicate and/or potassium silicate is dissolved in water. These alkali metal silicates are preferred because of their low cost and commercial availability. It has been found that they are effective in combination. The low alkaline type alkali metal silicates are used. Most effective results are obtained with sodium silicates in which the ratio of $Na_2O$ to $SiO_2$ lies between 1:3.22 and 1:3.75, and with potassium silicates in which the ratio of $K_2O$ to $SiO_2$ lies between about 1:2.20 and 1:2.50.

These silicates are normally obtained as aqueous solutions, sometimes called water glass. The composition of the sodium silicate solution is about 32–40% sodium silicate, whereas the composition of the potassium silicate solution is about 27–28% potassium silicate.

The complex magnesium aluminum silicates used herein are not appreciably water soluble. Hectorite is obtained as a coarse white powder. It is a complex magnesium silicate containing small amounts of $Al_2O_3$, $Fe_2O_3$, CaO, $Na_2O$, $K_2O$, and $Li_2O$. Montmorillonite is also a soft mineral. It is a complex aluminum silicate containing small amounts of MgO, CaO, and $Na_2O$ and $K_2O$. Both hectorite and montmorillonite are constituents of the bentonite group of clays.

A 3% suspension of either the hectorite or the montmorillonite is prepared separately since these materials can be more readily dispersed in water alone. This is best done by mixing on one day, letting the mixture stand until the next day, and then continuing the blending operation for a short period, after which it can be mixed with the other ingredients, or used as stock. It is also best to dilute the solutions of alkali metal silicates before trying to combine them with the hectorite or montmorillonite suspension. This is because of the difference in viscosity between the suspension and the more viscous alkali metal silicate solution. The dilutions are made by adding an equal part of water to the solution of sodium or potassium silicate, the measuring being done by weight.

In the preparation of preferred coating suspensions the ranges of the respective ingredients employed will be of the following order of magnitude:

| | Parts by weight |
|---|---|
| Hectorite or montmorillonite | 0.6–1.0 |
| Alkali silicate *solution*, such as sodium silicate, and/or potassium silicate | 4–9.0 |
| Added water | 90–95 |

On an "added water" free basis:

| | |
|---|---|
| Hectorite or montmorillonite | 7–20 |
| Alkali silicate *solution*, such as sodium silicate, and/or potassium silicate | 80–93 |

The proper amount of hectorite or montmorillonite suspension is weighed out, and about ¾ of the total water to be added is blended with it. Then the diluted alkali solution or solutions are blended in and the balance of the water is added. The slurry must be kept well dispersed during use. This is best done by slow stirring so as not to introduce excessive amounts of air.

Before the coating can be applied it is necessary that the magnesium surface be properly cleaned. If necessary the magnesium surface can be degreased by washing in chlorothene. This is followed by immersing the magnesium part in an alkaline cleaning bath at 200 F. for ten minutes. This bath is comprised of sodium hydroxide, trisodium phosphate and water. A particularly satisfactory composition of the bath is as follows:

| | Ounce |
|---|---|
| Sodium hydroxide NaOH | 8 |
| Trisodium phosphate, $Na_3PO_4 \cdot 12\ H_2O$ | 1⅓ |
| Water on make one gallon. | |

The part is rinsed in hot water and oven dried. This process only cleans the surface; it does not etch it.

An alternative method of surface preparation may be employed which is less effective and more expensive. The degreased part is immersed in a saturated aqueous solution of Alum, $Al_2(SO_4)_3 \cdot 18\ H_2O$ for three minutes at 190° F. It is immediately rinsed in hot water and dried.

After the cleaning of the magnesium surface the part may be dipped in the coating material. This is done at room temperature. When the whole surface has been wetted the part is removed from the suspension and dried as soon as possible at about 300° F.

If the oven has circulating air it is possible to dry the coating uniformly in about four minutes at this temperature. As applied the coating will be very thin and after drying almost invisible.

The final step in the process involves baking which effects a dehydration and reaction with the underlying metal. The time required for this reaction step depends, of course, upon the temperature. In the temperature range 675° to 800° F. this transformation is sufficiently fast for rapid production of coated parts. About two minutes are required at 800° F. while about six minutes are required at the lower end of the range. Lower temperatures may be used when longer baking time may be tolerated.

When the part is cool a second application may be made since best results have been obtained when two coats are applied. This technique has produced parts of attractive appearance having a soft metal luster with a slightly gold cast.

The preparation of a corrosion resistant magnesium or magnesium alloy die casting may be illustrated by the following examples.

EXAMPLE I

After cleaning in the alkali cleaning bath as illustrated above a surface coating is applied to the magnesium die casting. The coating material is a suspension prepared from a mixture of the following ingredients:

| | Parts by weight |
|---|---|
| Hectorite | 0.6 |
| Sodium silicate solution | 3.0 |
| Potassium silicate solution | 3.0 |
| Added water | 93.4 |

The sodium silicate solution consists of 32% by weight $Na_2O \cdot 3.75SiO_2$, balance water and the potassium silicate solution consists of 27.3% by weight $K_2O \cdot 2.50SiO_2$, balance water.

After the application of the coating the die casting is dried at about 300° F. and then baked for two minutes at about 800° F. until the coating composition has reacted with the underlying metal to provide a superior corrosion resistant surface.

EXAMPLE II

After cleaning in the alkali cleaning bath as illustrated above, a surface coating is applied to the magnesium die casting. The coating material is a suspension prepared from a mixture of the following ingredients:

| | Parts by weight |
|---|---|
| Hectorite | 1.0 |
| Sodium silicate solution | 4.5 |
| Potassium silicate solution | 4.5 |
| Added water | 9.0 |

The sodium silicate solution composition as in Example I.

The potassium silicate solution composition as in Example I.

Following the application of the coating the die casting is dried at about 300° F. and then baked for two minutes at about 800° F. until the coating composition has reacted with the underlying metal to provide a superior corrosion resistant surface.

EXAMPLE III

The surface of the magnesium die casting is cleaned in an alkali cleaning bath as illustrated above and subsequently coated. The coating material that is applied is a suspension prepared from a mixture of the following ingredients:

| | Parts by weight |
|---|---|
| Montmorillonite | 0.6 |
| Sodium silicate solution | 3.0 |
| Potassium silicate solution | 3.0 |
| Added water | 93.4 |

The sodium silicate solution composition and the potassium silicate solution composition as in Example I.

After the coating application the magnesium die casting is dried at about 300° F. and then baked for six minutes at about 675° F. until the coating composition has reacted with the underlying metal to provide a superior corrosion resistant surface.

EXAMPLE IV

The surface of the magnesium die casting is cleaned in an alkali cleaning bath as illustrated above and subsequently coated. The coating that is applied is a suspension prepared from a mixture of the following ingredients:

| | Parts by weight |
|---|---|
| Hectorite | 0.6 |
| Potassium silicate solution | 6.0 |
| Added water | 93.4 |

The potassium silicate solution composition as in Example I.

After the coating application the magnesium die casting is dried at about 300° F. and then baked for six minutes at about 675° F. until the coating composition has reacted with the underlying metal to provide a superior corrosion resistant surface.

EXAMPLE V

The surface of the magnesium die casting is cleaned in an alkali cleaning bath as illustrated above and subsequently coated. The coating that is applied is a suspension prepared from a mixture of the following ingredients:

| | Parts by weight |
|---|---|
| Hectorite | 0.6 |
| Sodium silicate solution | 0.6 |
| Added water | 93.4 |

The sodium silicate solution composition as in Example I.

After the coating application the magnesium die casting is dried at about 300° F. and then baked for six minutes at about 675° F. until the coating composition has reacted with the underlying metal to provide a superior corrosion resistant surface.

EXAMPLE VI

The surface of the magnesium die casting is cleaned in an alkali cleaning bath and a coating is subsequently applied. The coating material is a suspension prepared from a mixture of the following ingredients:

| | Parts by weight |
|---|---|
| Hectorite | 0.6 |
| $Na_2O \cdot 3.75SiO_2$ | 0.96 |
| $K_2O \cdot 2.50SiO_2$ | 0.82 |
| Water | 97.6 |

After the coating application the magnesium die casting is dried at about 300° F. and then baked for about six minutes at about 675° F. until the coating composition has reacted with the underlying metal to provide a superior corrosion resistant surface.

While the embodiments of the present invention as herein disclosed constitute preferred forms, it is to be understood that other forms may be adopted.

What is claimed is as follows:

1. A method of preparing a magnesium die casting having a corrosion resistant surface which comprises means of cleaning the surface of said casting, applying a silicate coating to the surface of said casting, drying said coating, and the heating of said magnesium die casting until said coating has been dehydrated and has reacted with the underlying metal, said coating composition comprising 0.6 to 1.0 part by weight of a complex magnesium-aluminum silicate, 2 to 4.5 parts by weight of an aqueous solution of low alkaline type sodium silicate, 2 to 4.5 parts by weight of an aqueous solution of low alkaline type potassium silicate, 90 to 95 parts by weight of water, said sodium silicate solution consisting of 32 to 40% by weight sodium silicate and the balance water, said potassium silicate solution consisting of 27 to 28% by weight potassium silicate and the balance water.

2. A method as set forth in claim 1 wherein the surface of the magnesium die casting is cleaned by immersion in an alkaline cleaning bath, said bath comprised of sodium hydroxide, trisodium phosphate, and water.

3. A method as set forth in claim 1 wherein said solution of potassium silicate is entirely replaced by said solution of sodium silicate so that said coating composition is comprised of from 4 to 9 parts by weight of said aqueous solution of a low alkaline type sodium silicate.

4. A method as set forth in claim 1 wherein said solution of sodium silicate is entirely replaced by said solution of potassium silicate so that said coating composition is comprised of from 4 to 9 parts by weight of said aqueous solution of a low alkaline type potassium silicate.

5. A method as set forth in claim 1 wherein said complex magnesium-aluminum silicate is hectorite.

6. A method as set forth in claim 1 wherein said complex magnesium-aluminum silicate is montmorillonite.

7. A method as set forth in claim 1 wherein said heating of said casting and said coating is accomplished at a temperature of from 675° F. to 800° F.

8. A method as set forth in claim 1 wherein said coating composition comprises, 0.6 to 1.0 part by weight of a complex magnesium-aluminum silicate, 0.6 to 1.8 parts by weight of a low alkaline type sodium silicate, 0.5 to 1.3 parts by weight of a low alkaline type potassium silicate, 95.9 to 98.3 parts by weight of water.

9. A method as set forth in claim 8 wherein said sodium silicate is entirely replaced by said potassium silicate so that said coating composition is comprised of from 1.0 to 2.6 parts by weight low alkaline type potassium silicate.

10. A method as set forth in claim 8 wherein said potassium silicate is entirely replaced by said sodium silicate so that said coating composition is comprised of from 1.2 to 3.6 parts by weight low alkaline type sodium silicate.

11. A magnesium die casting having a corrosion resistant surface resulting from the application thereto and the reacting thereon of a coating composition comprising 0.6 to 1.0 part by weight of a complex magnesium-aluminum silicate, 2.0 to 4.5 parts by weight of an aqueous solution of low alkaline type sodium silicate, 2.0 to 4.5 parts by weight of an aqueous solution of low alkaline type potassium silicate, 90 to 95 parts by weight of water, said sodium silicate solution consisting of 32 to 40% by weight sodium silicate and the balance water, said potassium silicate solution consisting of 27 to 28% by weight potassium silicate and the balance water.

12. A magnesium die casting having a corrosion resistant surface as set forth in claim 11 wherein said solution of potassium silicate is entirely replaced by said solution of sodium silicate so that said coating composition is comprised of from 4 to 9 parts by weight of said aqueous solution of a low alkaline type sodium silicate.

13. A magnesium die casting having a corrosion resistant surface as set forth in claim 11 wherein said solution of sodium silicate is entirely replaced by said solution of potassium silicate so that said coating composition is comprised of from 4 to 9 parts by weight of said aqueous solution of a low alkaline type potassium silicate.

References Cited

UNITED STATES PATENTS

| | | | |
|---|---|---|---|
| 1,451,755 | 4/1923 | Backer | 148—6.27 |
| 3,214,287 | 10/1965 | Mosna | 148—6.27 |

OTHER REFERENCES

DeLong, Light Metal Age, vol. 2, No. 3, 1944, pp. 10, 11, 18. TNI, L48, 117-A1.

RALPH S. KENDALL, *Primary Examiner.*

UNITED STATES PATENT OFFICE

CERTIFICATE OF CORRECTION

Patent No. 3,378,410 April 16, 1968

Helen B. Barlett

It is certified that error appears in the above identified patent and that said Letters Patent are hereby corrected as shown below:

Column 2, line 40, "200 F." should read -- 200° F. --; line 46, "on" should read -- to --. Column 3, line 42, "9.0" should read -- 90.0 --. Column 4, line 22, "0.6" should read -- 6.0 --.

Signed and sealed this 19th day of August 1969.

(SEAL)
Attest:

Edward M. Fletcher, Jr.
Attesting Officer

WILLIAM E. SCHUYLER, JR.
Commissioner of Patents